March 6, 1928.  F. C. KROEGER  1,661,372

ENGINE STARTER

Filed Dec. 7, 1925 2 Sheets-Sheet 1

Inventor
Frederick C. Kroeger
By Spencer Sewall & Hardman
his Attorneys

March 6, 1928. 1,661,372

F. C. KROEGER

ENGINE STARTER

Filed Dec. 7, 1925 2 Sheets-Sheet 2

Inventor
Frederick C. Kroeger
By Spencer Sewall Hardman
his Attorneys

Patented Mar. 6, 1928.

1,661,372

UNITED STATES PATENT OFFICE.

FREDERICK C. KROEGER, OF ANDERSON, INDIANA, ASSIGNOR, BY MESNE ASSIGNMENTS, TO DELCO-REMY CORPORATION, OF DAYTON, OHIO, A CORPORATION OF DELAWARE.

ENGINE STARTER.

Application filed December 7, 1925. Serial No. 73,939.

This invention relates to engine starting apparatus, and more particularly to the type of apparatus which comprises an electric motor, and a gear driven by the motor and movable endwise into mesh with a gear connected with the engine to be started. The driving connections between the electric motor and the endwise-movable gear include an overrunning clutch in order to permit said gear to overrun the motor shaft when the engine becomes self-operative.

It is among the objects of the present invention to simplify the construction of starting apparatus of this type, in order to reduce the cost of manufacture.

Further objects and advantages of the present invention will be apparent from the following description, reference being had to the accompanying drawings, wherein a preferred form of the present invention is clearly shown.

Figure 1:
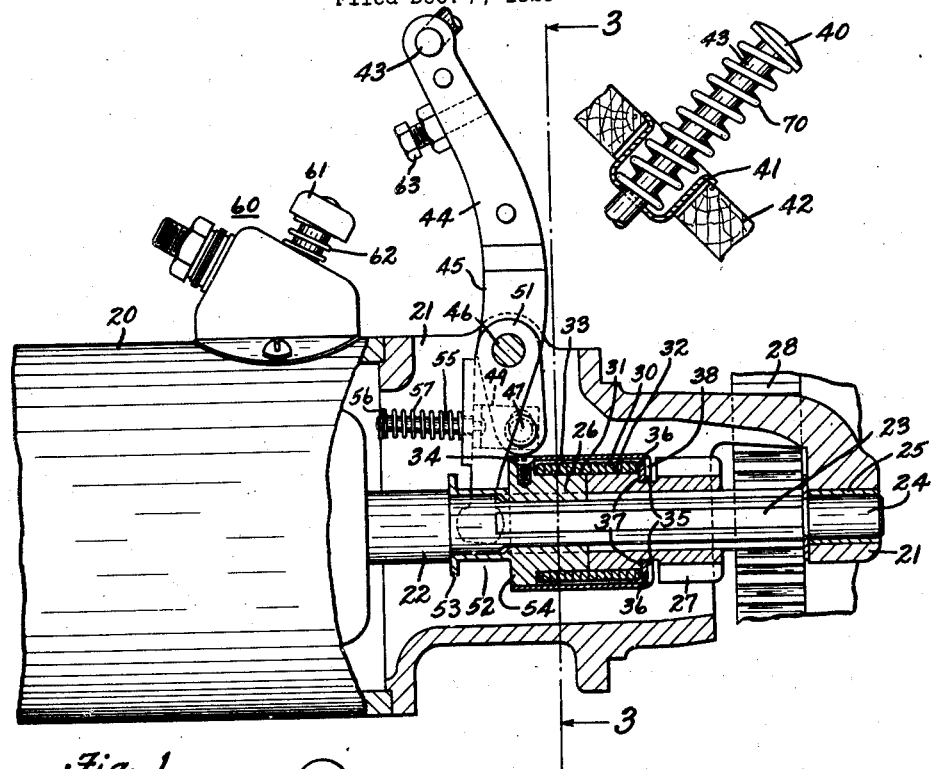
Fig. 1 is a fragmentary side view, partly in section, of engine starting apparatus embodying the present invention.

Referring to the drawings, 20 designates the field frame of an electric motor which is attached to a gear housing and frame 21 adapted to be mounted upon the frame of an engine to be started. The motor includes a shaft 22, which is provided with splines 23 and with a journal portion 24 supported by a bearing 25 provided by the frame 21.

A sleeve 26 is slidable endwise along the shaft 22, and is driven by the shaft through its splines 23. A gear 27 is slidable endwise along the shaft 22 into engagement with the gear 28 of an engine to be started. Motion is transmitted from the sleeve 26 to the gear 27 through an overrunning clutch of the friction type. This clutch includes a coil spring 30 which frictionally engages the exterior of the cylindrical portion or drum 31 provided by the sleeve 26, and the exterior of the cylindrical portion or drum 32 provided by the hub of the gear 27. These cylindrical portions 31 and 32 are coaxial and are of the same external diameter so as to provide, in effect, a continuous cylindrical surface which is embraced by the coil 30. These cylindrical portions are maintained in abutment by a tube 33 which is secured by a screw 34 to the sleeve 26, and which is provided with a flange 35 abutting two half washers 36 which engage a shoulder 37 provided by the hub of the gear 27. The flange 35 is provided with notches 38 in order that the tube 33 may be passed over the gear 27 in locating the tube in the position shown in the drawings. The parts 33, 35 and 36 enclose the spring to protect it and the clutch drums from dirt and other foreign matter. This spring clutch is of the type shown in the patent to C. C. Tillotson, No. 850,981, patented April 23, 1907. Rotary motion is transmitted from the sleeve 26 to the gear 27 in one direction only through the spring 30. The turns of the spring 30 are normally in relatively slight frictional contact with the drums 31 and 32. When the drum 31 starts to rotate relative to the drum 32, the drum 31 drags the spring 30 after it and the spring 30 tends to drag the drum 32 after it. In one direction of rotation of the drum 31, this frictional drag will tend to cause the spring 30 to wind up and contract around the drums 31 and 32 and thus drivingly connect the sleeve and pinion. In the opposite direction of relative rotation between the drums 31 and 32, this frictional drag will tend to unwind the spring 30 and cause it to release its frictional grip upon the clutch drums. It is apparent, therefore, that when the gear 27 is rotated at a greater speed than the sleeve 26 in the direction of rotation in which motion is transmitted through the spring 30 from the sleeve 26 to the gear 27, the turns of the spring 30 will likewise tend to expand and will be released from motion-transmitting engagement with the cylindrical member 32. This inherent feature of spring clutches of the type disclosed in the Tillotson patent is utilized by applying the clutch to engine starting apparatus. Since the spring clutch permits the clutch member 32 to overrun the clutch member 31, in the manner described, it is evident that although the gear 27 may be driven by the engine gear 28, after the engine has become self-operative, motion will not be transmitted from the engine to the motor shaft 22 to cause the latter to rotate at an excessive speed.

Figure 5:
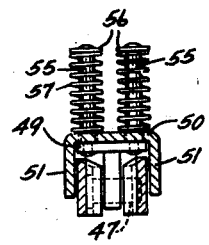
Fig. 5 is a sectional view on the line 5—5 of Fig. 4.

Any suitable device may be employed for moving the clutch and gear 27 endwise along the shaft 22 and for connecting the motor with a source of current. One form of such device includes a pedal rod 40 extending through a cup 41 attached to the floor-board 42 of an automobile. The rod is attached at 43 to a bifurcated lever 44 having arms 45 pivoted upon a rod 46 which is supported by the frame 21. The lower ends of the arms 45 support a pin 47 which passes through a slot 48 in a block 49. As viewed in Fig. 5, the block 49 is T-shaped,—the stem of the T providing the slot 48 and the top of the T bearing against a lever yoke 50 which connects lever arms 51 supported by the rod 46. The lower ends of the arms 51 are received by a groove 52 which is defined by flanges 53 and 54 provided by the sleeve 26. Studs 55 extend through holes in the lever yoke 50, and are attached at one end to the T 49 and carry washers 56 at the other end. Springs 57 surround the studs 55 and are located between the washers 56 and the yoke 50.

The motor is connected with a source of current by a switch 60 including an actuating plunger 61 which is normally maintained in circuit-open position by spring 62. A screw 63, adjustably attached to the lever 44, engages the switch plunger 61 during the movement of the lever 44 from the position shown in Fig. 1, to that shown in Fig. 2.

Figure 2:
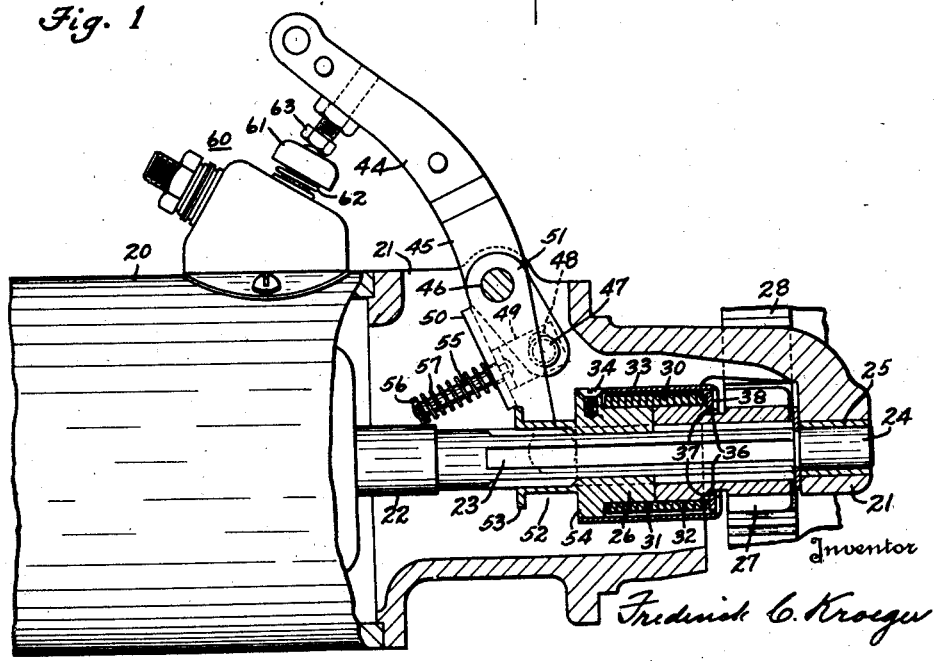
Fig. 2 is a view similar to Fig. 1, showing the apparatus connected with a gear of the engine to be started.
Figure 3:
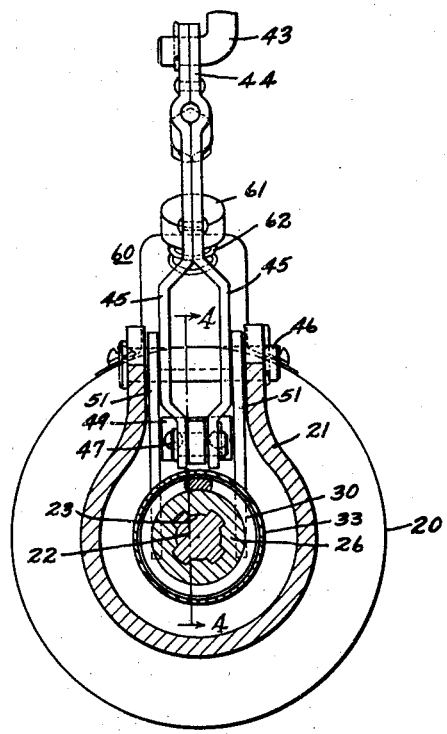
Fig. 3 is a sectional view on the line 3—3 of Fig. 1.
Figure 4:
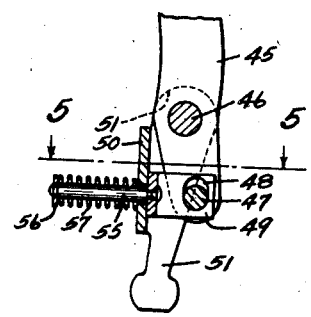
Fig. 4 is a fragmentary sectional view of a portion of the motor gear shifting means, this view being taken on the line 4—4 of Fig. 3.

To start the engine, the pedal 40 is pressed downwardly to cause the levers 44 and 51 to move counterclockwise, and the clutch members and gear 27 to move endwise toward the right from the position shown in Fig. 1, to the position shown in Fig. 2. In case the abutting of the gear 27 with the ends of the teeth of gear 28 prevents meshing of the gears, the springs 57 will yield in order to permit closing of the switch 60, while the gear 27 is yieldingly pressed against the gear 28. The closing of switch 60 causes the motor shaft 22 to turn in order to move the gear 27 into registry with the gear 28, whereupon the springs 57 will be released to quickly move the clutch members and gear 27 toward the right, and to effect the meshing of the gear 26 with the gear 28. In case gear tooth abutment does not occur, then it is obvious gear 27 will be engaged with gear 28 before the screw 63 engages the plunger 61 of switch 60.

When the motor becomes self-operative it will tend to drive the gear 27 at a greater speed than said gear is driven by the motor. The friction clutch will permit the gear 27 to overrun the motor shaft. After the engine has been started, the operator will release the pedal 40, whereupon a spring 70, which is located between the cup 41 and the head of the pedal 40, will cause the levers 44 and 51 to be moved clockwise and the sleeve 26 to be moved endwise toward the left from the position shown in Fig. 2 to that shown in Fig. 1. Motion will be transmitted from the sleeve 26 to the gear 27 through the parts 34, 33, 35 and 36, so that endwise movement of the sleeve 26 toward the left will cause the gear 27 to be demeshed from the gear 28.

While the form of embodiment of the invention as herein disclosed, constitutes a preferred form, it is to be understood that other forms might be adopted, all coming within the scope of the claims which follow.

What is claimed is as follows:

1. Engine starting apparatus comprising, in combination, a motor, a shaft operated by the motor, a sleeve driven by the shaft and movable along the shaft, a gear movable along the shaft, a clutch connecting the gear and sleeve and comprising axially aligned friction drums provided respectively by the gear and sleeve, and comprising a coiled spring frictionally engaging and encircling the drums, means for moving the clutch, sleeve and gear endwise along said shaft, and means for enclosing the spring and for preventing separation of the clutch drums while permitting relative rotary movement thereof.

2. Engine starting apparatus as defined by claim 1 in which the means which enclose the spring comprises a tube attached to the sleeve, said tube having a flange engaging a part provided by the gear in order to prevent separation of the clutch drums while permitting relative rotary movement thereof.

In testimony whereof I hereto affix my signature.

FREDERICK C. KROEGER.